Oct. 7, 1969            J. E. RAIDEL            3,471,165
MULTIPLE JOINT TANDEM SUSPENSIONS
Filed Sept. 25, 1967            4 Sheets-Sheet 4
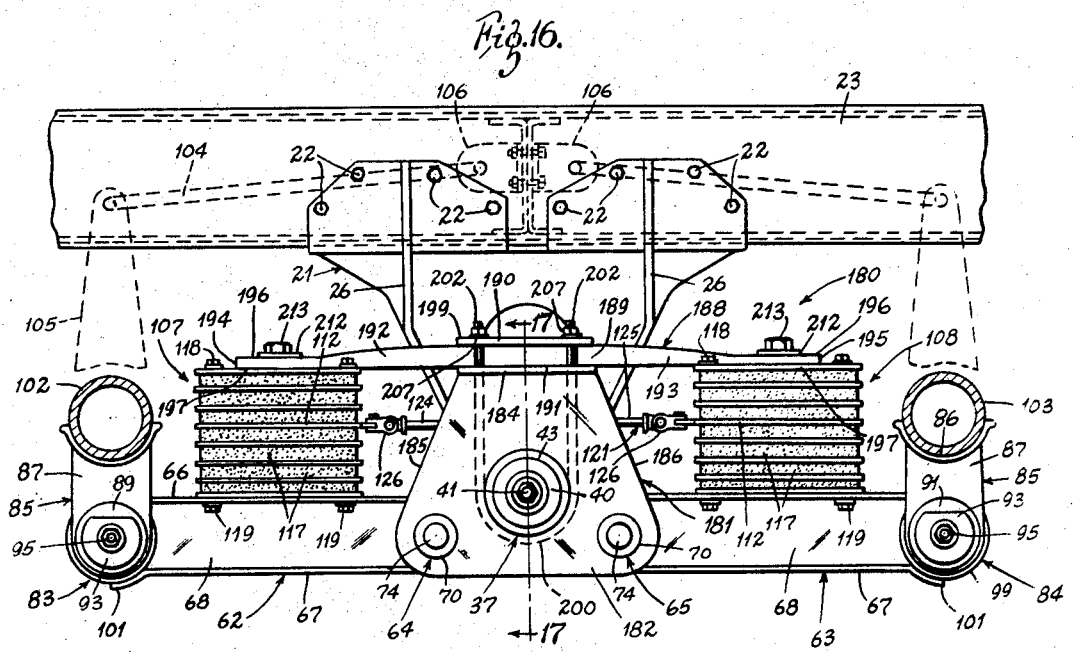
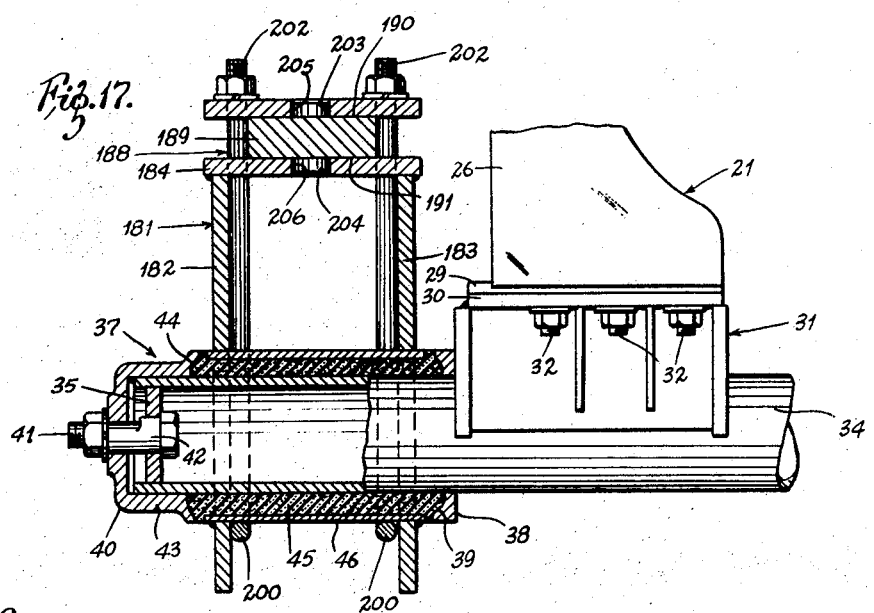
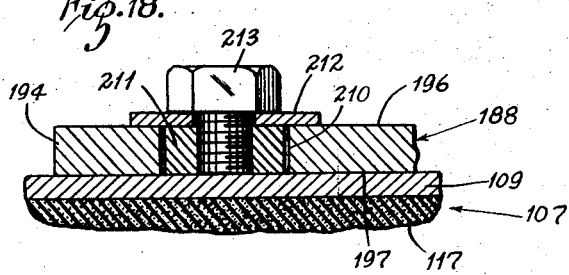
INVENTOR:
JOHN E. RAIDEL,
BY Kingsland, Rogers, Ezell, Eilers & Robbins
ATTORNEYS United States Patent Office 3,471,165
Patented Oct. 7, 1969

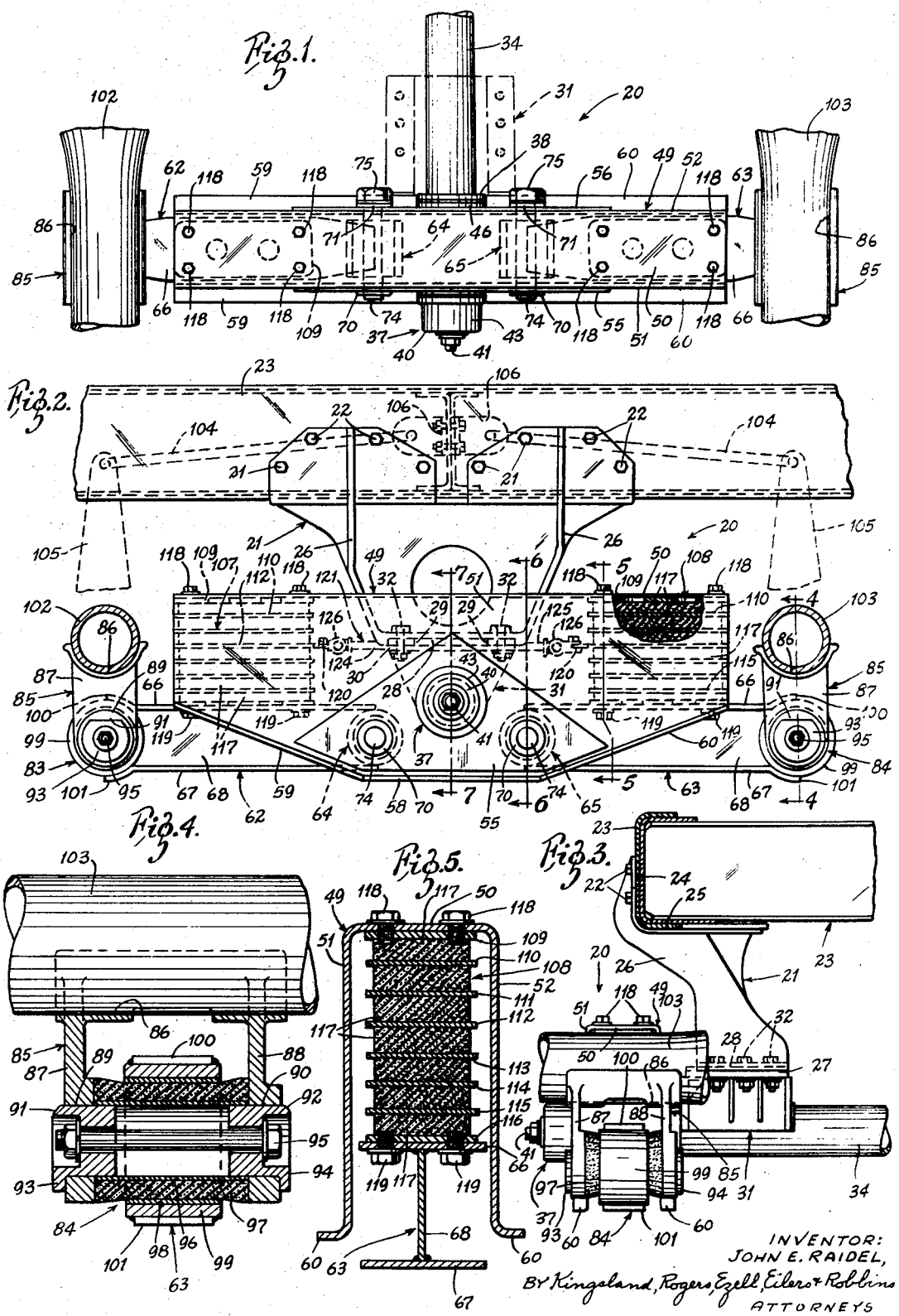

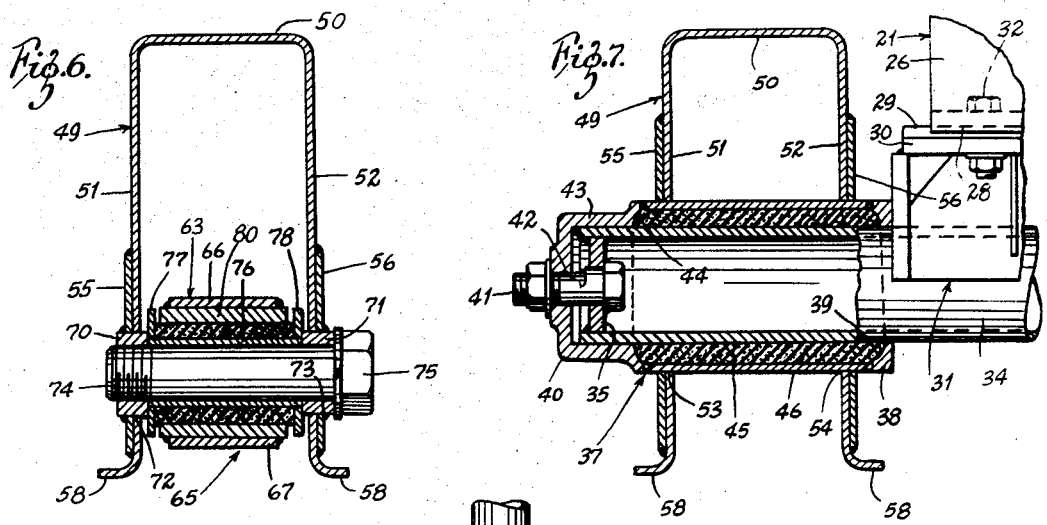

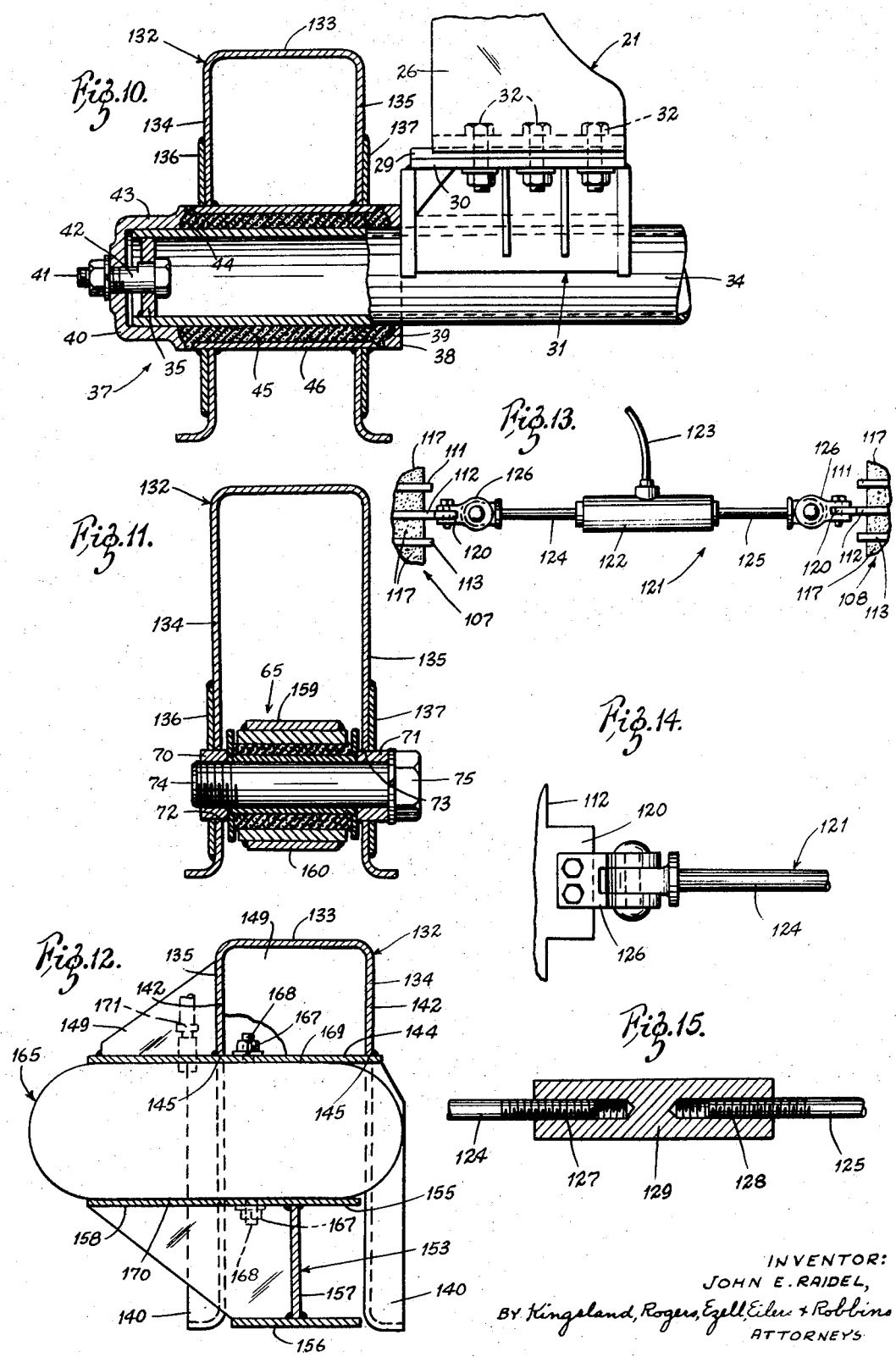

3,471,165
MULTIPLE JOINT TANDEM SUSPENSIONS
John E. Raidel, Rte. 9, Box 400–M,
Springfield, Mo. 65804
Filed Sept. 25, 1967, Ser. No. 670,262
Int. Cl. B60g 5/02
U.S. Cl. 280—104.5         9 Claims

ABSTRACT OF THE DISCLOSURE

A tandem vehicle suspension having a compensator member pivotally supported on a transverse trunnion depending from a vehicle chassis, independent forwardly and rearwardly extending torque beams pivotally connected to the compensator at one end and to the forward and rearward axles, respectively, at their other ends, and compressible members between the compensator and the torque beams, the respective pivotal connections causing both compression and shear forces to be applied to the compressible members to create greater reactive forces and better load distribution between the two axles.

---

The torque beams are connected to the compensator by resilient bushings and to the axles by resilient trunnions or bushings with the result of automatic tracking by the wheels mounted on the axles. The resilient bushings connecting the torque beams to the compensator are on opposite sides of and below the transverse trunnion so that reacting moments and forces on stopping and starting the truck tend to drive the compensator downwardly, thereby reducing bouncing.

In one embodiment, the compressible members are elastomer springs with an adjustable ride compensator rod connection between them to compound the shear resistance and make it adjustable for different ride qualities. In another embodiment, the compressible members are air springs.

In a third embodiment, the compensator comprises a leaf spring bearing against the upper sides of the elastomer springs.

BRIEF DESCRIPTION OF THE INVENTION

On each side of the truck body, a pedestal is suspended from the chassis. A trunnion shaft is mounted between the pedestals, and a compensator in the form of an inverted U-shaped channel member is pivotally connected by a resilient bushing to each end of the trunnion shaft. Forwardly and rearwardly extending torque beams are pivotally connected by resilient bushings to the channel member and by resilient trunnions or bushings to the respective forward and rearward axles. In one embodiment of the invention, an elastomer spring, formed of metal plates separated by rubber blocks, is mounted between the upper side of the channel member and each torque beam. The relative positions of the pivotal connections and of the elastomer springs is such that, each time a torque beam pivots or the compensator oscillates because of load changes or shifts or because of shocks from uneven roadways, the torque beam and/or the compensator applies not only a compressive, but also a shear force to the elastomer spring resting on the torque beam. Also, the spring members are fastened to the individually articulating torque beams and corresponding compensator. The compensator oscillates independently from its trunnion pivot and equalizes the load distribution among the axles. The torque beams are pivoted to the compensator and axle brackets, providing the axles an independent axle movement.

Torque beams and compensators form with the built-in spring members a flexing-walking type body which is connected at the center to a trunnion tube and through the pedestal mounted to the chassis frame. A rod is connected between central plates of the two elastomer springs so that the shear load applied is resisted by the compound resistance to shear of both elastomer springs. The torque rod is adjustable in length to vary the preloading of the elastomer springs in shear and to alter the riding quality of the suspension assembly. The adjustment may be manually done, or automatically remote controlled from the truck cab.

In another embodiment of the invention, air springs are substituted for the elastomer springs. Other conventional springs could also be used.

In a third embodiment, the compensator includes a leaf spring extending forwardly and rearwardly and connected to the upper sides of the elastomer springs. When the elastomer springs are compressed, the leaf spring yields, thereby further dampening shock forces imparted to the wheels of the truck and isolating the body from those shock forces.

The bushing which connects the compensator to the trunnion shaft is above and between the bushings which connect the torque beams to the compensator. Therefore when the truck brakes are applied, the resulting moments and forces against the compensator are in a downward, rather than an upward, direction and are of sufficient magnitude to substantially reduce bouncing.

Also, since the connectors of the torque beams and the compensator are by resilient bushings, limited lateral swinging of the torque beams can take place when the vehicle makes a turn. The wheels automatically track with the turn, thereby reducing or eliminating skidding and providing a safer, more certain control of the truck.

DESCRIPTION OF THE DRAWINGS

FIGURE 1 is a top plan view of the tandem suspension assembly;

FIGURE 2 is a side elevation view of the tandem suspension assembly with portions shown in section;

FIGURE 3 is a rear end elevation view, as viewed from the right end of FIGURE 2;

FIGURE 4 is an enlarged view in section taken along the line 4—4 of FIGURE 2;

FIGURE 5 is an enlarged view in section taken along the line 5—5 of FIGURE 2;

FIGURE 6 is an enlarged view in section taken along the line 6—6 of FIGURE 2;

FIGURE 7 is an enlarged view in section taken along the line 7—7 of FIGURE 2;

FIGURE 8 is a top plan view of a modified form of tandem suspension that employs air springs;

FIGURE 9 is a side elevation view of the tandem suspension of FIGURE 8;

FIGURE 10 is an enlarged view in section taken along the line 10—10 of FIGURE 9;

FIGURE 11 is an enlarged view in section taken along the line 11—11 of FIGURE 9;

FIGURE 12 is an enlarged view in section taken along the line 12—12 of FIGURE 9;

FIRURE 13 is a side elevation view of the torque bar assembly;

FIGURE 14 is a fragmentary enlarged top plan view of the torque bar connecting hinge;

FIGURE 15 is a fragmentary view in longitudinal medial section showing a modified form of torque bar expander;

FIGURE 16 is a side elevation view of a modified form of suspension assembly;

FIGURE 17 is an enlarged view in section taken along the line 17—17 of FIGURE 16; and FIGURE 18 is a fragmentary view in section showing the connection of the spring and compensator of FIGURE 16.

DETAILED DESCRIPTION OF THE INVENTION

The tandem suspension assembly 20 of FIGURES 1–7 comprises a pedestal 21 fastened by a plurality of bolts 22 to a truck chassis 23. The pedestal 21 has suitable bearing surfaces 24 and 25 that enable it to be rigidly tightened to the truck chassis 23, and has suitable stiffening flanges 26. At its lower end, the pedestal 21 has a flat lower side 27 having a transverse recess 28 for receiving two transverse spacer plates 29 against which the upper plate 30 of a cast bracket 31 is mounted. The cast bracket 31 and the spacer plates 29 are fastened to the pedestal 21 by a plurality of bolts 32.

The cast bracket 31 rests upon and is welded to a trunnion shaft 34 that extends the width of the truck body. As shown in FIGURE 7, the trunnion shaft 34 is hollow and has an internal end plate 35 welded in place.

A bushing assembly 37 is mounted on the trunnion shaft 34 outwardly of the cast bracket 31. The bushing assembly 37 includes a disk 38 bearing against the cast bracket 31 and welded to the trunnion shaft 34. The disk 38 has a concave face 39. A trunnion cap 40 is mounted onto the end of the trunnion shaft 34 by a bolt 41 that extends through the trunnion cap 40 and the end plate 35. The section 42 of the bolt 41 that is journaled in the end plate 35 is eccentric relative to the shank of the bolt. The trunnion cap 40 has a radially outwardly extending flange 43 with a concave face 44. A rubber bushing 45 is mounted on and adhered to the trunnion shaft 34 between the concave faces 39 and 43 of the disk 38 and end caps 40. A metal sleeve or housing 46 is adhered to and surrounds the rubber bushing 45, and is positioned between the disk 38 and the annular flange 42 of the end cap 44, restricting axial movement relative to the trunnion shaft 34.

A compensator 49 comprises an inverted U-shaped channel member having a top 50 and sides 51 and 52. The compensator 49 is mounted on the sleeve 46 with the sleeve 46 extending through openings 53 and 54 in the sides 51 and 52. The compensator 49 is reinforced by a pair of plates 55 and 56 welded to the sides 51 and 52 and also to the sleeve 46. The lower edges of the channel member 49 have central flanges 58 that are horizontal and are joined to forward and rearwardly inclined flanges 59 and 60.

A pair of torque beams 62 and 63 preferably in the form of I-beams are pivotally connected to the channel member 49 by bushing assemblies 64 and 65. Each I-beam 62 and 63 comprises upper and lower horizontal plates 66 and 67 and a central vertical web 68. The axes of the bushing assemblies are below the axis of the bushing assembly 37, preferably by at least two inches.

As shown in FIGURE 6, each bushing assembly 64 and 65 includes a pair of collars 70 and 71 mounted and welded within holes 72 and 73 in the plates 55 and 56 and sides 51 and 52 of the compensator 49. The collar 70 is internally threaded to receive the threaded end 74 of a bolt 75. A metal sleeve 76 is mounted on the bolt 75 between the collars 70 and 71, and a pair of retainer washers 77 and 78 are mounted on the sleeve between the collars 70 and 71. A rubber bushing 79 is mounted on the sleeve 76 between the retainer washers 77 and 78, and another metal sleeve 80 is mounted on the bushing 79. The torque beam 63 has an arcuate slot 82 cut in it to fit around the side of the sleeve 80, and the web 68 at the slot 82 and the upper and lower plates 66 and 67 are welded to the sleeve 80.

The torque beams 62 and 63 extend forwardly and rearwardly, respectively, to a pair of trunnion assemblies 83 and 84. As shown in FIGURE 4, each trunnion assembly 83 and 84 comprises a bracket 85 having an upper concave seat 86 with opposite downwardly extending arms 87 and 88 having openings 89 and 90 in them. A pair of collars 91 and 92 is mounted in the openings 89 and 90, the collars having flanges 93 and 94 to act as stops. The collars are held in place by a bolt 95. A metal sleeve 96 is mounted on the inner ends of the collars 91 and 92, and a rubber bushing 97 is mounted on the sleeve 96. Another metal sleeve 98 is mounted on the bushing 97, with a metal ring 99 being rotatably mounted about the sleeve 98. The upper and lower plates 66 and 67 of the torque beam 63 have spread ends 100 and 101 that are welded to the ring 99.

The concave seat 86 of the bracket 85 corresponding to the trunnion assembly 83 is welded to the front axle 102 of the truck body. Similarly, the concave seat 86 of the bracket 85 corresponding to the trunnion assembly 84 is welded to the rear axle 103.

Radius rods 104 are pivotally connected between brackets 105 and 106, the brackets 105 being welded to centers of the axles 102 and 103 and the brackets 106 being bolted to the centers of the frame cross members. These radius rods (shown in broken lines) are conventional, to stabilize the axles at all times.

An elastomer spring 107 is mounted within the compensator 49 between the upper plate 66 of the torque beam 62 and the upper wall 50 of the compensator. A similar elastomer spring 108 is mounted within the compensator 49 between the upper plate 66 of the torque beam 63 and the upper wall 50 of the compensator 49. As shown in FIGURE 5, each elastomer spring 107 and 108 comprises a plurality of metal plate 109, 110, 111, 112, 113, 114, 115 and 116 separated by rubber blocks 117 permanently joined and adhered to the plates 109–116 in a stack as illustrated. The upper plate 109 is fastened to the top wall 50 of the compensator 49 by a plurality of cap screws 118, and the lower place 116 is fastened to the upper plate 66 of the torque beam 63 by a plurality of cap screws 119.

A central one of the plates 109–116, such as the plate 112, has an extension 120, and a torque rod assembly 121 is connected between the plate exensions 120, particularly as shown in FIGURES 13 and 14.

As shown in FIGURE 13, the rod assembly 121 comprises a double piston cylinder 122 having an air or hydraulic or combination air and hydraulic control tube 123 connected to it. A rod 124 extends from one end of the single or double acting cylinder and another rod 125 extends from the other end of the cylinder 122. The rod 124 is connected by a standard hinge 126 to the plate extension 120 from the elastomer spring 107. The other rod 125 is connected by a standard hinge 126 to the plate extension 120 of the elastomer spring 108.

The tube 123 may lead to appropriate controls (not shown) to a lever in the cab of the truck. This enables the truck driver to operate the lever to adjust the pressure within the cylinder 122 to select the degree of extension or retraction of the rods 124 and 125 from the cylinder 122.

Alternatively, as illustrated in FIGURE 15, the rods 124 and 125 may have oppositely threaded ends 127 and 128 threaded into a manually rotatable shackle 129. Rotation of the shackle 129 increases or decreases the total length of the torque rod assembly 121 as is known in the art.

Operation of the embodiment of FIGURES 1–7

The suspension assembly 20 shown in FIGURES 1–7 is, of course, duplicated on opposite sides of the truck chassis, 23, with the trunnion shaft 34 extending the width of the truck and being common for both suspension assemblies, and with the axles 102 and 103, as well as the chassis 23, being similarly connected to both assemblies.

The functions of the suspension assemblies 20 are to resiliently support varying total loads carried by the vehicle body above the vehicle chassis 23, to respond to uneven distribution of loads either forwardly or rearwardly of the vehicle chassis, compensating for such uneven distribution and distributing such loads substantially equally to both axles 102 and 103, and to react to and dampen individual shock forces applied to either axle 103 or 104 by rought or uneven spots in the roadway.

In addition, as has been said, the use of the resilient bushings 64 and 65 and the resilient trunnions or bushings 83 and 84 permits limited lateral turning of the torque beams 62 and 63 relative to the compensator 49, and limited lateral turning of the axles 102 and 103 relative to the torque beams 62 and 63. Also, the resilient bushing 37 permits limited lateral turning of the compensator 49 relative to the trunnion shaft 34. As a result, when the truck turns a corner, the wheels carried by the axles 102 and 103 can and do track with the turn. This eliminates skidding of the tires on the roadway and gives the driver better control of the truck or trailer.

Assume first that an uneven distribution of load is carried by the vehicle chassis 23. With an even load, there is virtually no tendency of the truck chassis 23 to swing downwardly at either its forward or rearward end to rock the pedestal 21 and apply a torsional load to the bushing assembly 37. The applied load is vertical, and the vertical load is transmitted through the pedestal, the trunnion shaft 34, and the bushing assembly 37 into a vertical downward force on the compensator 49. As the compensator 49 moves downwardly under the vertical load, it applies pressure to the upper sides of the elastomer springs 107 and 108 and, at the same time, moves the bushing assemblies 64 and 65 downwardly. Since the axles 103 and 104 are substantially immovable because the tires they support rest upon the immovable roadway, downward movement of the channel member 49 produces clockwise rotation of the torque beam 62 about the bushing assembly 64 and counterclockwise rotation of the torque beam 63 about the bushing 65, as viewed in FIGURE 2. This combined action produces net compressive forces against the upper and lower sides of the elastomer springs 107 and 108, both of which compress somewhat but, at the same time, absorb the variations in load carried by the truck chassis.

There is a similar action when one of the axles 102 or 103 is bounced upwardly by an unevenness in the roadway. For example, if the axle 102 moves upwardly, it swings the torque beam 62 in a clockwise direction about the bushing 64, tending to compress the elastomer spring 107. The elastomer spring 107 reacts with a force tending to rotate the compensator 49 in a clockwise direction to rotate the pedestal 21 and vehicle chassis 23 in a clockwise direction. However, as soon as the compensator starts to rotate in a clockwise direction, it depresses the bushing assembly 64 to create an upward movement of the torque beam 63 while the upper side of 50 of the compensator 49 applies a downward pressure against the elastomer spring 108. The resulting compression of the elastomer spring 108 is in reaction to the compression of the elastomer spring 107 and tends to equalize the orientation of the compensator 49 and maintain the vehicle chassis 23 level.

It is of particular significance to this invention that the axes of rotation of the bushing assemblies 64 and 65 are below the upper plates 66 of the torque beams 62 and 63. Therefore, the radial distance of the plates 109–116 of the elastomer spring 107 and 108 from their respective bushing assemblies 64 and 65 increases progressively from the lowermost plate 116 to the uppermost plate 109, and the radius of each of the plates 107–116 from their respective bushing assemblies changes as the torque beams 62 and 63 rotate. Consequently, each time one of the torque beams 62 or 63 swings upwardly, it applies not only a compressive force to its elastomer spring 107 or 108, but also applies shear forces as the elastomer springs 107 and 108 are forced askew from their generally rectangularly sandwich orientations illustrated in FIGURE 2. These applied shear forces are in addition to the applied compressive forces.

The torque bar 121 connected between the two plates 112 of the elastomer springs 107 and 108 also contributes to the shear resistance of the elastomer springs 107 and 108. Because of the torque rod 121, each longitudinal movement of portions of one of the elastomer springs 107 or 108 caused by swinging movement of one of the torque beams 62 or 63, is restricted not only by the shear resistance of the one elastomer spring, but also of the other elastomer spring because of the orientation of the rod 121.

The elastomer springs 107 and 108 can be preloaded to any desired shear by the automatic adjustment from the vehicle cab as shown in FIGURE 13 or the manual adjustment shown in FIGURE 15.

It will be noted that although the suspension assembly 20 compensates for the different kinds of loads in an effective and versatile way, the suspension assembly 20 is of relatively lightweight construction while still maintaining superior strength characteristics. In particular, it will be noted that the use of the I-beams 62 and 63 provides lightweight and yet strong arms leading from the axle brackets 85 to the channel member 49.

A feature of this invention is the formation of the bolt 41 that supports the compensator 49. Since the bolt 41 has the eccentric 42, the bolt can be loosened and rotated to balance the compensator.

Description of the embodiment of FIGURES 8–12

One of the features of this invention is that many of its principles are adaptable to a suspension assembly 130 that utilizes air springs instead of the elastomer springs 107 and 108 incorporated in FIGURES 1–7, with many parts being usable for either embodiment. Where the parts for the embodiment of FIGURES 8–12 are identical to those for the embodiment of FIGURES 1–7, reference characters have been retained. Thus, an examination of FIGURES 8–12 shows that many components are interchangeable with those of the embodiment of FIGURES 1–7, such as the pedestal 21, the bracket 31, the trunnion shaft 34, the bushing assembly 37, the bushing assemblies 64 and 65, the trunnion assemblies 83 and 84, and the brackets 85.

In FIGURES 8–12, the compensator 131 includes an inverted U-shaped channel member 132 having a top wall 133 and side walls 134 and 135. Plates 136 and 137 are welded to the side walls 134 and 135. Each of the side walls 134 and 135 of the channel member 132 has a central downwardly extending wall 138 within a lower horizontal flange 139 and side flanges 140 and 141 that may be inclined slightly from vertical planes. To either side of the central panels 138, the sides 134 and 135 of the channel member 132 have narrower forwardly and rearwardly extending panels 142 and 143. A plate 144 is welded to the lower edges of the panels 142, extending rearwardly of the flanges 140 within appropriate slots 145 in the sides 134 and 135. A similar plate 146 is welded to the lower edges of the panels 143, extending forwardly of the flanges 141 within a slot 147 in the sides 134 and 135. The plates 144 and 146 may have the general configuration illustrated in FIGURE 8, with reinforcing webs 148 and 149 welded to them and to the side 135 of the channel member 132.

A pair of I-beams 153 and 154 are formed with upper and lower plates 155 and 156 and a vertical web 157. The upper plates 155 of the I-beams 153 and 154 have inward extensions 158 as illustrated in FIGURE 12. These inward extensions 158 may have the same edge configuration as the plates 144 and 146. The upper and lower plates 155 and 156 also have flange extensions 159 and 160 enabling the I-beams 153 and 154 to be welded to the metal sleeves 80 of the respective bushing assemblies 64 and 65. Likewise, the upper and lower plates 155 and 156 have flanges 161 and 162 enabling them to be welded to the metal sleeves 99 of the respective trunnion assemblies 83 and 84.

An air spring 165 is mounted between the plate 144 and the upper plate 155 of the I-beam 153. A similar air spring 166 is mounted between the plate 146 and the upper plate 155 of the I-beam 154. As shown in FIGURE 12, this mounting of the air springs 165 and 166 is accomplished by threading nuts 167 onto studs 168 extending upwardly from the upper sides 169 and downwardly from the lower sides 170 of the casings of the air springs 165 and 166. The air springs 165 and 166 have fittings 171 for connection to a suitable air supply and control. The air supply and control are conventional and are not shown. Likewise, the air springs 165 and 166 are conventional and are not themselves a part of this invention except in the combination shown and described.

Operation of the embodiment illustrated in FIGURES 8–12

The suspension assembly 130 illustrated in FIGURES 8–12 operates similarly to the suspension assembly 20 except that the air springs 165 and 166 replace the elastomer springs 107 and 108. The air springs 165 and 166 react to the same kinds of load, and those loads are applied in the same way as was described in connection with the suspension assembly 20. While the air springs 165 and 166 do not apply reactive shear forces as such, nevertheless, their bases 170 which rest upon the plates 155 of the I-beams 153 and 154 are above the axes of rotation of the bushing assemblies 64 and 65, and the locking effected by tightening the nuts 167 onto the studs 16 prevents sidewise sliding movement of the upper and lower surfaces 169 and 170 of the air springs 165 and 166. Since the casings for the air springs 165 and 166 are flexible, but not elastic, transverse shifting of the lower side 170 of an air spring relative to its upper side 169 necessarily tends to reduce the internal volume of the air spring, which is resisted by the trapped air. Therefore, greater resistance to variations in applied load is accomplished and provided by the air springs 165 and 166, since their casings are subjected not only to compressive forces, but to shear forces. As is apparent, the tension rod 121 shown in FIGURES 13 and 14 is not used with the air spring suspension assembly 130.

A modification of the suspension assembly 20 illustrated in FIGURES 1–7 is shown in FIGURES 16 and 17. The suspension assembly 180 shown in FIGURES 16 and 17 has a different form of compensator 181 comprising opposing plates 182 and 183 with a top plate 184 welded to their upper edges. The opposing plates 182 and 183 have inclined side edges 185 and 186 as shown in FIGURE 16.

A large leaf spring 188 is mounted on the plate 184. The leaf spring has a thick central section 189 having flat upper and lower surfaces 190 and 191, and has tapered sections 192 and 193 leading to narrower end sections 194 and 195 also having flat upper and lower surfaces 196 and 197.

Another plate 199 is mounted above the leaf spring 189. A pair of U-bolts 200 and 201 extend around the bushing 37, either inside or outside the opposed sides 182 and 183, with their upper ends 202 extending through appropriate openings in the plates 184 and 199. The U-bolts 200 and 201 lie on opposite sides of the leaf spring 289 as shown in FIGURE 17. There are upper and lower bosses 203 and 204 welded to the upper and lower sides of the leaf spring 189 and projecting into holes 205 and 206 in the plates 199 and 184, respectively. When nuts 207 are tightened onto the ends 202 of the U-bolts 200 and 201, the leaf spring 189 is tightly clamped in place.

Each outer end section 194 and 195 of the leaf spring 188 has a hole 210 through it. A boss 211 is welded to the upper plate 109 of each elastomer spring assembly 107 and 108 and projects into the hole 210. A plate 212 larger than the diameter of the hole 211 rests upon each end section 194 and 195, and a stud 213 extends through a hole in the plate 212 and is threaded into the boss 211. In this manner, the ends 194 and 195 are connected to the upper side of the elastomer springs 107 and 108.

All other parts of the suspension assembly 180 may be identical to those of the suspension assembly 20 as previously described. In the suspension assembly 180 of FIGURES 16 and 17, the leaf spring 188 provides additional dampening of the shock forces that are incurred.

Various changes and modifications may be made within the purview of this invention as will be readily apparent to those skilled in the art.

What is claimed is:

1. A vehicle suspension assembly comprising a pedestal adapted to be suspended from a vehicle chassis between two axles of the vehicle, a compensator block, means for connecting the compensator block to the pedestal for oscillating movement of the compensator block relative to the pedestal about an axis parallel to the axles of the vehicle, a forward beam, means for pivotally connecting one end of the forward beam to the compensator block and pivotal linkage means for connecting the other end of the forward beam ot the front one of the two vehicle axles, a rearward beam, means for pivotally connecting one end of the rearward beam to the compensator block and pivotal linkage means for connecting the other end of the rearward beam to the rear one of the two vehicle axles, forward compression spring means between the forward beam and the compensator, rearward compression spring means between the rearward beam and the compensator, each compression spring means biasing the adjacent beam in a downward direction and the compensator block in an upward direction, the pivotal connections of the beams being below the connecting means between the compensator block and the pedestal.

2. The vehicle suspension assembly of claim 1 wherein the spring means comprise resilient rubber sandwich layers.

3. The vehicle suspension assembly of claim 1 wherein the spring means comprise air springs.

4. The vehicle suspension assembly of claim 2 including rod means interconnecting central portions of the rubber sandwich springs, and means to vary the length of the rod means to adjust the shear preload on the rubber sandwich springs.

5. The vehicle suspension assembly of claim 4 wherein the last-named means comprises a remotely controllable pressure-responsive piston assembly.

6. The vehicle suspension assembly of claim 1 wherein the compensator includes a leaf spring against which the compression spring means bear.

7. The vehicle suspension assembly of claim 1 wherein the connecting means between the compensator and the pedestal comprises a rotary eccentric for changing the oscillatory axis of the compensator relative to the pedestal.

8. The vehicle suspension assembly of claim 2 wherein the rubber sandwich springs are mounted above the radial axes of the beams so that rotational movement of the beams imparts both shear and compressive changes in the resistive reactions of the rubber sandwich springs.

9. The vehicle suspension assembly of claim 1 wherein the beams comprise I-beams.

References Cited

UNITED STATES PATENTS 3,241,856   3/1966   Raidel.

PHILIP GOODMAN, Primary Examiner

U.S. Cl. X.R.

267—21